United States Patent [19]

Kureha et al.

[11] 4,139,799
[45] Feb. 13, 1979

[54] CONVERGENCE DEVICE FOR COLOR TELEVISION RECEIVER

[75] Inventors: Takeshi Kureha, Hirakata; Taiichi Saeki, Katano, both of Katano, Japan

[73] Assignee: Matsushita Electric Industrial Co., Ltd., Osaka, Japan

[21] Appl. No.: 799,361

[22] Filed: May 23, 1977

[30] Foreign Application Priority Data

May 25, 1976 [JP] Japan .................. 51-60929

[51] Int. Cl.$^2$ .............................. H01J 29/51
[52] U.S. Cl. .................. 315/13 C; 315/368; 358/180
[58] Field of Search .......... 315/13 C, 368; 358/287, 358/180

[56] References Cited

U.S. PATENT DOCUMENTS

| | | | |
|---|---|---|---|
| 2,679,614 | 5/1954 | Friend | 315/13 C |
| 2,836,761 | 5/1958 | Howitt et al. | 315/368 X |
| 2,880,364 | 3/1959 | Kolesnik et al. | 315/368 |
| 2,903,622 | 9/1959 | Schopp | 315/368 |
| 3,419,748 | 12/1968 | Neal et al. | 315/13 C |
| 3,821,591 | 6/1974 | Lister | 315/368 X |
| 3,943,279 | 3/1976 | Austefjord | 315/368 X |
| 3,953,666 | 4/1976 | Justice et al. | 358/180 X |

OTHER PUBLICATIONS

"Multivision, A Multi-Purpose Television System" by Takuji Abe et al., Broadcasting, S0249,0030.

Primary Examiner—Malcolm F. Hubler
Attorney, Agent, or Firm—Burgess, Ryan and Wayne

[57] ABSTRACT

Disclosed are a convergence device consisting of a circuit for generating a signal in synchronism with the horizontal sync signal and a circuit for generating a sinusoidal waveform current in response to the output signal from the signal generating circuit so that part of the sinusoidal waveform current may be used as a convergence correction or adjustment current, and a color television receiver incorporating the convergence device of the type described and capable of enlarging part of a picture.

10 Claims, 5 Drawing Figures

CONVERGENCE DEVICE FOR COLOR TELEVISION RECEIVER

BACKGROUND OF THE INVENTION

The present invention relates to a convergence device for providing precise convergence adjustment with sinusoidal current in an efficient manner.

In color television receivers with a three-gun color kinescope with a shadow mask, color pictures are reproduced in general with three primary colors, that is, red, green and blue colors, and in order to excite color dots or dot trios three electron guns are provided. That is, each beam passes through an aperture opening or hole of the shadow mask to excite its respective color dots on a phosphor screen, without exciting the other two colors.

However, color fringing inevitably results because (1) the red, green and blue electron guns are spaced apart from each other and (2) the radius of curvature of the phosphor dot screen is considerably deviated from an ideal radius of curvature so that one may view clear pictures. In order to correct this color fringing, convergence circuits are in general employed in color television receivers, and they are divided into two types based upon their functions, one type for correcting color fringing caused by the construction of a color television receiver itself and the other type for correcting color fringing due to the production variations of electron guns and shadow masks.

The color fringing due to the construction of a color television receiver itself may be corrected by flowing parabolic current through convergence coils, but the correction of color fringing due to the production and assembly variation requires correction with magnets or the like at the center portion of the phosphor dot screen. That is, correction asymetrical with respect to the center of the phosphor dot screen is required.

Meanwhile more precise convergence adjustment is increasingly demanded for high quality picture reproduction. The convergence circuits for completely eliminating color fringing caused by the two reasons described above are extremely complex in construction. For instance if the tolerance of misconvergence after convergence adjustment is 0.5 to 1.0 mm over the whole phosphor dot screen of a color kinescope from 18 to 20 inches in size, the scope of dynamic convergence parabolic current must be changed in the former and last halves of a cycle independently of each other. Power amplifiers each as Class-B amplifiers, have been used to flow asymmetrical currents through convergence coils.

With such convergence circuits precise convergence adjustments are possible but there arises a problem that the power consumption increases. For instance, with a horizontal dynamic convergence circuit utilizing the Class-B amplifier as the power amplifier, the power consumption increases as much as 40 W.

In color television receivers capable of enlarging (zooming) part of a picture, one horizontal scan is made within 10 microseconds out of the 63.5 microsecond horizontal scanning time in the NTSC system even though the convergence adjustment is the same. As a result, the waveform of the parabolic convergence current must be changed to a considerable degree. As a result, the power consumption further increases with the Class-A amplifier type horizontal convergence circuits.

SUMMARY OF THE INVENTION

In view of the above, one of the objects of the present invention is to provide a convergence device of the type wherein part of a sinusoidal current is used so that even when part of the picture is enlarged (to be referred to "in the zoom mode"), precise convergence adjustment without color fringing may be effected in an efficient manner without causing an increase in power consumption.

To the above and other ends, the present invention provides a convergence device characterized by the provision of a signal generating circuit for generating a signal in response to and in frequency-synchronism with horizontal pulses such as horizontal sync signals, and a sinusoidal waveform current generating circuit responsive to the output signal from said signal generating circuit for generating a sinusoidal waveform current so that part of said sinusoidal waveform current may be used as the convergence adjustment or correction current.

The above and other objects, features and advantages of the present invention will become more apparent from the description of one preferred embodiment thereof taken in conjunction with the accompanying drawings.

DESCRIPTION OF THE PREFERRED EMBODIMENT

Figure 1:
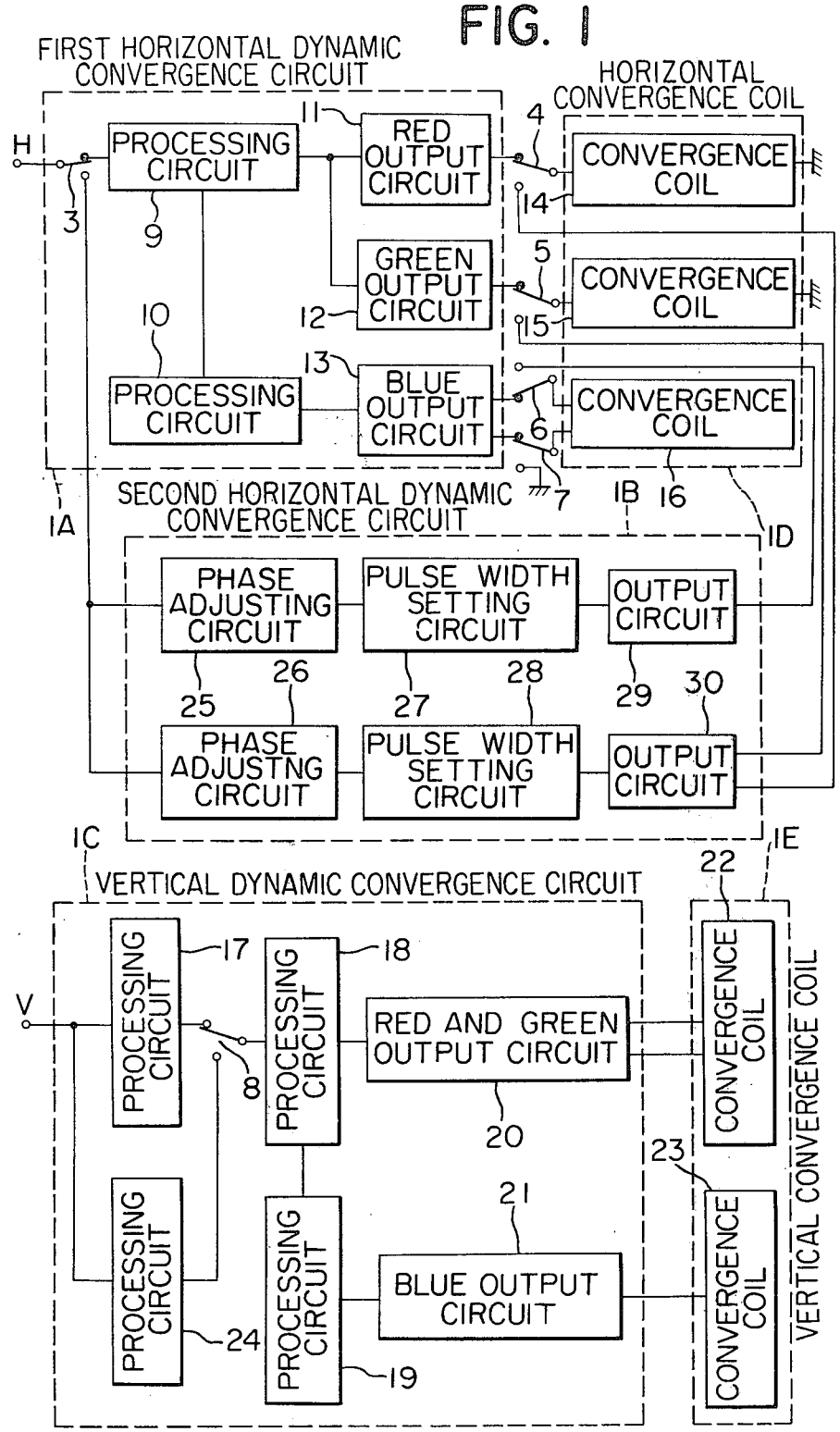
FIG. 1 is a block diagram of a preferred embodiment of a convergence device in accordance with the present invention.

In FIG. 1 there is shown a block diagram of one preferred embodiment of a convergence device in accordance with the present invention having a dynamic convergence circuit consisting of a first horizontal dynamic convergence circuit 1A, a vertical dynamic convergence circuit 1C, a horizontal convergence coil 1D and a vertical convergence coil 1E. During operation switches 3 through 8 are held in position shown in FIG. 1.

The first horizontal convergence circuit 1A utilizing the Class-B amplifier as the output power amplifier, and the horizontal pulses applied to a terminal H pass through processing circuits 9 and 10 to red, green and blue output circuits 11, 12 and 13 which in turn are connected through the switches 4, 5, 6 and 7 to convergence coils 14, 15 and 16, respectively. In this specification, the term "horizontal pulses" refers to those derived from the rear stage of a horizontal deflection oscillation section as with the horizontal sync pulses or flyback pulses.

In like manner the horizontal pulses are applied to an input terminal V of the vertical dynamic convergence circuit 1C, processed by processing circuits 17, 18 and 19 and applied to a red and green output circuit 20 and a blue output circuit 21 which in turn are connected to convergence coils 22 and 23, respectively.

When the switches 3 through 5 are reversed, the horizontal pulse input terminal H is connected to a second horizontal dynamic convergence circuit 1B to be described in detail hereinafter instead of the first horizontal dynamic convergence circuit 1A and the second horizontal convergence circuit 1B is connected to the horizontal dynamic convergence coil 1D so that the convergence device is switched to the zoom mode. It should be noted that in the zoom mode only the first horizontal dynamic convergence circuit 1A is switched to the second horizontal dynamic convergence circuit 1B while the remaining circuits remain unchanged.

Figure 2:
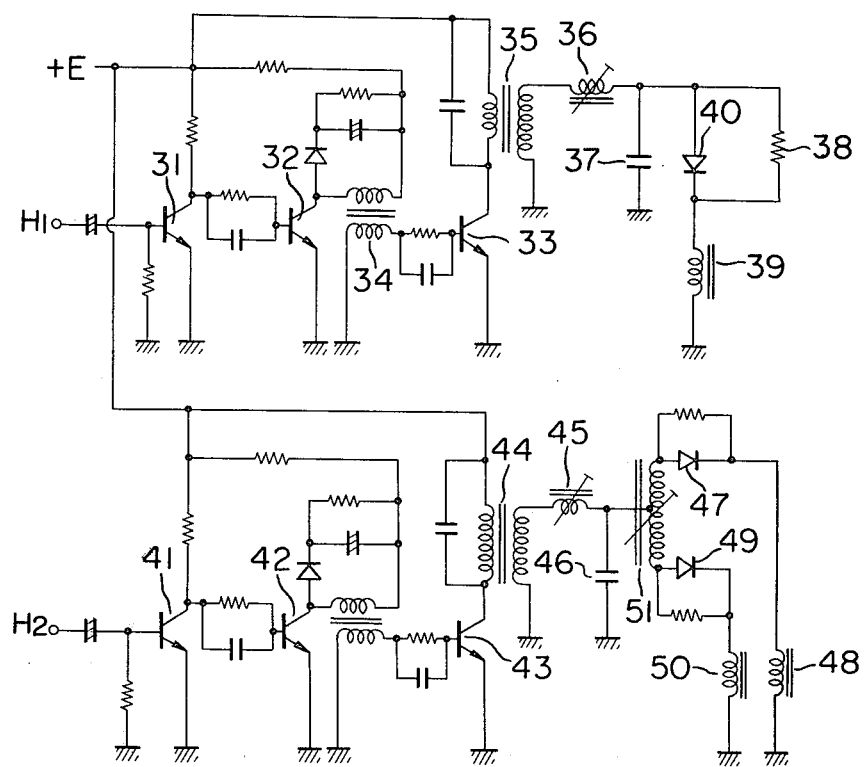
FIG. 2 is a diagram of a second horizontal dynamic convergence circuit thereof.

One example of the second horizontal dynamic convergence circuit 1B is shown in detail in FIG. 2. The output circuit 29 (See FIG. 1) consists of three transistors 31, 32 and 33 whereas the output circuit 30, three transistors 41, 42 and 43.

The horizontal pulses are applied to an input terminal $H_1$ and are amplified by the transistors 31 and 32. A drive transformer 34 drives the output transistor 33 to perform the switching operation at a frequency of horizontal pulses so that pulse voltage is derived from a transformer 35. The pulse voltage is oscillated by a resonance circuit consisting of an inductance 36 and a capacitor 37 so that a sinusoidal waveform voltage appears across the capacitor 37.

In like manner, in the output circuit 30 pulse voltage is derived from a transformer 44 and is converted into a sinusoidal waveform voltage by a resonance circuit consisting of an inductance 45 and a capacitor 46. A succeeding inductance 51 is of the differential type so that the magnitudes of currents flowing into convergence coils 48 and 50 may be suitably controlled. That is, the currents flowing through the red and green convergence coils 48 and 50 may be increased or decreased in a differential manner by moving a core of the inductance 51. As with the current flowing through a blue convergence coil 39, these currents are sinusoidal.

Figure 3:
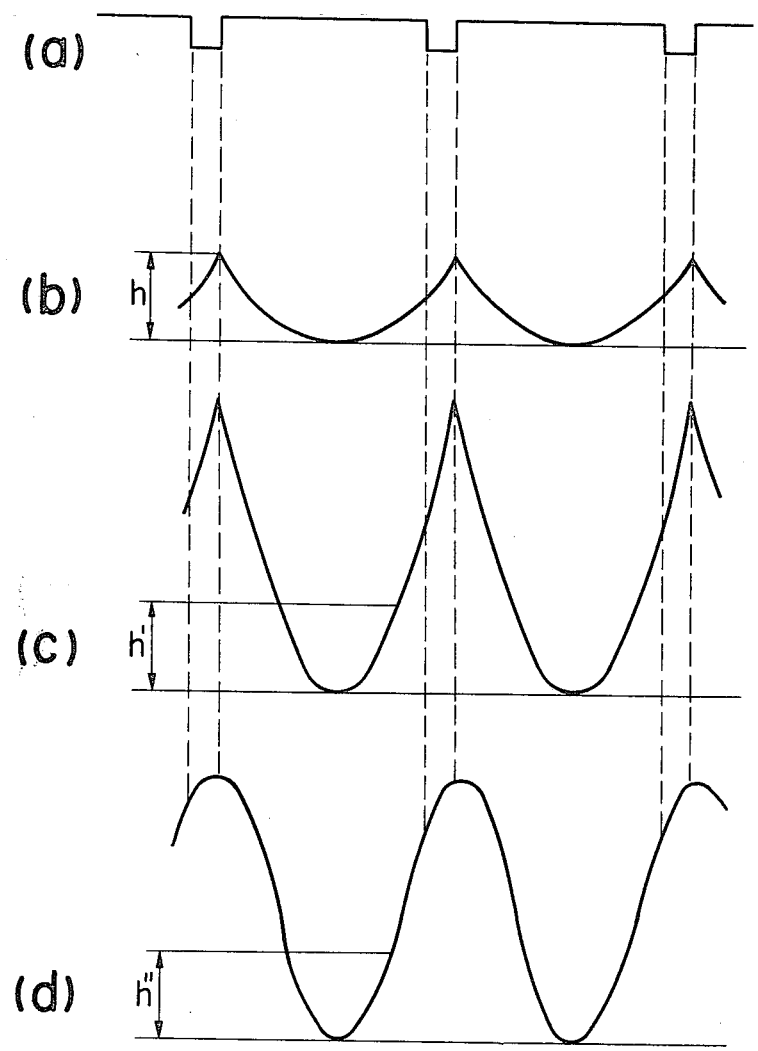
FIG. 3 shows waveforms used for the explanation of the mode of operation of the second horizontal dynamic convergence circuit shown in FIG. 2.

Next referring to FIG. 3, the relation between the horizontal sync pulses and the convergence coil current will be described. It is assumed that a parabolic convergence current (b) is derived by processing horizontal sync pulses (a) and is interrelated as shown. In the normal operation wherein the horizontal scanning corresponds to the width of the screen, the parabolic current (b) is required. When the convergence correction is different between the right and left edges or a higher degree of convergence correction is required at the edges, the driving circuit should be of the Class-B amplifier type as described elsewhere. To drive in the zoom mode, parabolic current of a greater amplitude is required as shown at (c) in FIG. 3. That is, with the parabolic convergence current (c) the center portion of the screen is enlarged in length twice as much as during normal operation, and the amplitude h' of the parabolic current (c) between one quarter and three quarters of the horizontal scanning time is substantially equal to the amplitude h of the parabolic current (b). When the parabolic current is used for zooming, its amplitude must be considerably increased as described above and consequently the power consumption is increased accordingly in the driving circuit.

However, when the switching circuit as shown in FIG. 2 is used, the increase in power consumption is less as compared with the system utilizing a Class-B amplifier. That is, the power consumption required to obtain zooming convergence current (d) having an amplitude substantially equal to that of the parabolic convergence current (b) is less than that of the system utilizing the Class-B amplifier. For instance the power consumption of the system utilizing the Class-B amplifier described hereinbefore is 40 W whereas the power consumption of the system of FIG. 2 in the zoom mode is only 15 W.

When a sinusoidal waveform is used instead of a parabolic waveform, linearity is degraded at the edges, but in the zoom mode only the center portion of the sinusoidal waveform convergence current is utilized so that convergence can be attained with a satisfactory degree of accuracy. Therefore the present invention utilizes a sinusoidal convergence current which may attain a satisfactorily precise convergence and which may permit the use of a switching circuit with less power consumption.

The switching over from the normal mode to the zoom mode may be accomplished by switching the switches 3 through 8 to the opposite positions from the positions shown in FIG. 1. Then the Class-B amplifier type first horizontal dynamic convergence circuit 1A is diconnected from the input terminal and the convergence coil 1D while the switching type second horizontal dynamic convergence circuit 1B is connected to the input terminal and the convergence coil 1D. The first horizontal dynamic convergence circuit 1A is also completely disconnected from a power supply and rendered inoperative so that in the zoom mode the power consumption required for dynamic convergence is the sum of the power consumption in the circuit 1B and the power consumption in the circuit 1C.

Referring back to FIG. 2, the variable inductances 36 and 45 may change their resonance frequencies so as to control the output voltages, thereby controlling the amplitude of the sinusoidal convergence current. Diodes 40, 47 and 49 connected in series to the convergence coils 39, 48 and 50, respectively, are used to clamp the peak of the sinusoidal convergence current to the zero level so that even when the amplitude of the sinusoidal convergence current is varied to change the convergence correction, no misconvergence occurs at the center of the screen because no current flows and the current is fixed at the center portion of the screen. As a result, the convergence at the edges may be attained in an efficient manner.

Referring back to FIG. 1, a circuit 25 in the second horizontal dynamic convergence circuit 1B is for setting the phase of current flowing through the convergence coil 16 and the horizontal pulses impressed on the terminal H and consists of for instance a monostable multivibrator. When the inductance 36 shown in FIG. 2 is changed in order to adjust the amplitude of the convergence correction current, the amplitude of the sinusoidal convergence current (d) in FIG. 3 also changes, causing the deviation of the phase of the convergence current from a value required for convergence adjustment. In order to correct this phase distortion, the phase adjusting circuit 25 is provided in order to adjust the phase of the horizontal pulses applied to the terminal $H_1$ in FIG. 1. A phase adjusting circuit 26 is provided in the second horizontal dynamic convergence circuit 1B for the same reason.

A pulse width setting circuit 27 is incorporated in the second horizontal dynamic convergence circuit 1B in order to set the pulse width of the horizontal pulses applied to the terminal $H_1$ in FIG. 2 so that the output transistor 33 (See FIG. 2) may be driven in an optimum manner. A pulse width setting circuit 28 has a function substantially similar to that of the circuit 27. The vertical dynamic convergence circuit 1C has a pulse width setting circuit similar to the circuits 27 and 28. A processing circuit 24 in the dynamic convergence circuit 1C is enabled in case of the zoom mode.

Figure 4:
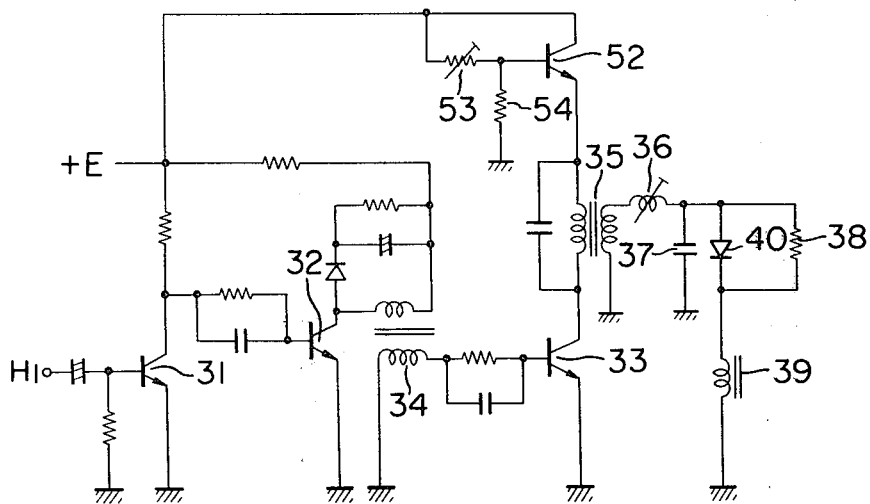
FIG. 4 is a circuit diagram of a modification of the second horizontal dynamic convergence circuit shown in FIG. 2.

In FIG. 4 there is shown a modification of the second horizontal dynamic convergence circuit 1B, wherein reference numerals 31 through 39 denote parts similar to those shown in FIG. 2. A circuit consisting of a transistor 52, a variable resistor 53 and a fixed resistor 54 is incorporated in order to adjust the amplitude of convergence current. More particularly, the variation in resistance of the variable resistor 53 results in the variation in voltage applied to the transformer 35 so that the peak value of the pulse derived across the secondary of the transformer 35 changes and consequently the amplitude of convergence correction current flowing through the convergence coil 39 may be continuously adjusted. That is, convergence may be adjusted by the adjustment of the variable resistor 53.

Figure 5:
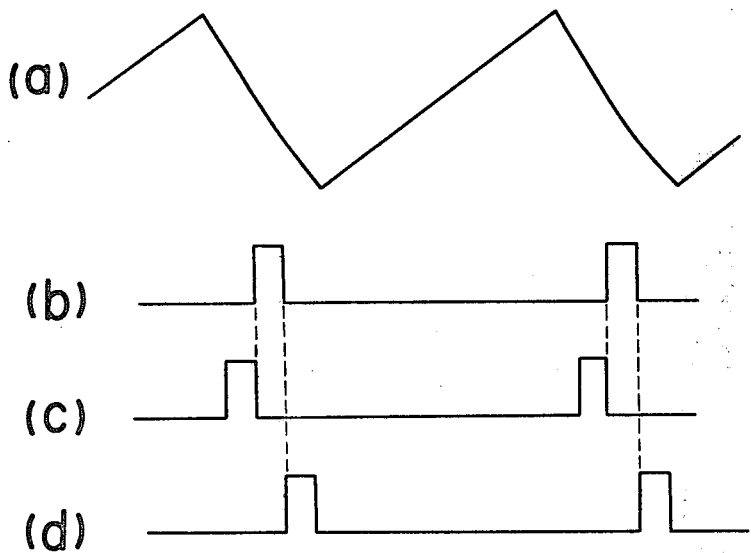
FIG. 5 shows waveforms used for the explanation of the mode of operation thereof.

So far the input to the terminal H (See FIG. 1) has been described as the horizontal sync signal, but strictly speaking, as shown in FIG. 5, the adjustment of the variable resistor results in the variation in phase of the horizontal sync signal with respect to the horizontal deflection current (a) as indicted at (b), (c) and (d). As a result, when the horizontal sync signal is applied to the terminal H (See FIG. 1), the phase relation between the convergence correction current and color fringing is caused to change more or less by the adjustment of the horizontal sync adjustment variable resistor. In order to avoid this problem, the pulses applied to the terminal H must be always in phase with the horizontal deflection current. To this end, the pulses such as flyback pulses derived from the rear stage in the horizontal deflection oscillation section are applied to the terminal H so that no color fringing occurs.

As described above, according to the present invention in a color television receiver capable of zooming and provided with a highly precise dynamic convergence correction circuit, the switching over from the normal mode to the zoom mode may be accomplished by switching the first horizontal dynamic convergence circuit to the second or switching type horizontal dynamic convergence circuit, and the convergence may be adjusted with a higher degree of accuracy while the power consumption may be considerably reduced.

The switching circuit may consist of a switching element, a pulse generating circuit consisting of an inductance and a capacitor and a series-connected circuit consisting of an inductance and a capacitor so that the switching circuit may be made very simple construction and the sinusoidal convergence current may be supplied in a very efficient manner.

Furthermore when a variable inductance is used as the inductance of the series-connected circuit, the convergence current may be controlled. That is, the resonance circuit consisting of an inductance and a capacitor has a dual function of shaping a waveform and controlling the convergence current. As a result, the switching circuit may be made simple in construction and fabricated at low cost. Furthermore a diode may be connected in series to a convergence coil so that the peak value of the sinusoidal convergence current may be easily clamped to the zero level.

Moreover a circuit for adjusting the pulse width of input pulses may be incorporated into a convergence circuit so that a convergence current output circuit may be driven under the same conditions both in the normal and zoom mode.

In addition, a circuit for adjusting the phase of input pulses may be added so that the adjustment of phase of convergence current may be easily accomplished. When the variable inductance is used in the resonance circuit for adjusting the amplitude of the convergence correction current, the readjustment is required because the phase relation between the horizontal pulses and the convergence correction current changes. However, according to the present invention the voltage to be applied to the transformer may be continuously changed as described above in conjunction with FIG. 4 so that the amplitude of the convergence correction current may be adjusted. As a result the re-adjustment may be eliminated and the convergence adjustment may be quickly attained.

What is claimed is:

1. A convergence device for a color television receiver capable of enlarging part of a picture focused on a screen, comprising:
    a first horizontal dynamic convergence circuit adapted to effect the convergence adjustment with parabolic current, and
    a second horizontal dynamic convergence circuit adapted to effect the convergence adjustment with part of a sinusoidal current, whereby convergence coil means through which convergence current flows when part of a picture is enlarged are connected through switch means to said second horizontal dynamic convergence circuit.

2. A convergence device as set forth in claim 1 wherein a diode is connected in series with said convergence coil means to clamp said sinusoidal current waveform.

3. A convergence device as set forth in claim 1 wherein said first horizontal dynamic convergence circuit is rendered completely inoperative when part of said picture is enlarged, and said convergence coil means is simultaneously connected to said second horizontal dynamic convergence circuit.

4. A convergence device for a color television receiver capable of enlarging part of a color television picture generated by electron beams focused on a screen, comprising:
    a first horizontal dynamic convergence circuit utilizing a parabolic current waveform to control the convergence of said electron beams;
    a second horizontal dynamic convergence circuit utilizing a sinusoidal current waveform to control the convergence of said electron beams;
    a common convergence coil means for applying a time-varying convergence magnetic field to said electron beams; and
    switching means for selectively connecting said convergence coil means to (i) said first horizontal dynamic convergence circuit when said picture is not enlarged, and (ii) said second horizontal dynamic convergence circuit when part of said picture is enlarged.

5. A convergence device as set forth in claim 4 wherein said second horizontal dynamic convergence circuit comprises a switching circuit for generating pulse signals in response to horizontal pulses corresponding to horizontal synchronizing signals, said switching circuit comprising:

a phase adjusting circuit for adjusting the relative phases of said horizontal pulses and said synchornizing signals;

a pulse width setting circuit for generating pulses having a predetermined pulse width in response to the output of said phase adjusting circuit; and a sinusoidal waveform generating circuit coupled to said second horizontal dynamic convergence circuit for generating sinusoidal waveform in response to the output of said pulse width setting circuit, whereby a portion of said sinusoidal waveform generates a convergence correcting current when said part of said picture is enlarged.

6. A convergence device as set forth in claim 5, wherein said sinusoidal waveform generating circuit comprises a resonant circuit.

7. A convergence device as set forth in claim 6, wherein said resonant circuit comprises a capacitor and an inductor in such a manner that the amplitude of the convergence current may be adjusted by the changing the value of said inductor.

8. A convergence device as set forth in claim 5, wherein said sinusoidal waveform generating circuit comprises a transformer coupled to said pulse width setting circuit for generating driving pulses.

9. A convergence device as set forth in claim 8, wherein the peak value of said driving pulses may be changed by the adjustment of a voltage impressed across said transformer to change the amplitude of a sinusoidal waveform current derived from said sinusoidal waveform generating circuit, thereby enabling convergence adjustment.

10. A convergence device as set forth in claim 5, wherein pulses derived from the rear stage of a horizontal deflection oscillation section of said receiver are applied to said phase adjusting circuit.

* * * * *